(12) United States Patent
Lengauer

(10) Patent No.: US 12,042,833 B2
(45) Date of Patent: Jul. 23, 2024

(54) METHOD AND A CONTROL DEVICE FOR OPERATING A COMBINED CASTING/ROLLING INSTALLATION

(71) Applicant: Primetals Technologies Austria GmbH, Linz (AT)

(72) Inventor: Thomas Lengauer, Weißkirchen a.d. Traun (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 104 days.

(21) Appl. No.: 16/346,584

(22) PCT Filed: Oct. 12, 2017

(86) PCT No.: PCT/EP2017/076004
§ 371 (c)(1),
(2) Date: May 1, 2019

(87) PCT Pub. No.: WO2018/082883
PCT Pub. Date: May 11, 2018

(65) Prior Publication Data
US 2019/0255584 A1 Aug. 22, 2019

(30) Foreign Application Priority Data
Nov. 7, 2016 (EP) .................................. 16197488

(51) Int. Cl.
*B21B 1/46* (2006.01)
*B21B 15/00* (2006.01)
(Continued)

(52) U.S. Cl.
CPC ............ *B21B 1/463* (2013.01); *B21B 38/006* (2013.01); *B21B 45/0233* (2013.01);
(Continued)

(58) Field of Classification Search
CPC ... B22D 11/124; B22D 11/1246; B22D 11/22; B22D 11/225; B22D 1/463; B22D 38/006; B21B 1/463; B21B 38/006
See application file for complete search history.

(56) References Cited

U.S. PATENT DOCUMENTS 4,256,168 A * 3/1981 Hein .................. B22D 11/1246
164/486
4,562,880 A 1/1986 Larrecq
(Continued)

FOREIGN PATENT DOCUMENTS

CN 205254067 U 5/2016
DE 195 08 476 A1 9/1996
(Continued)

OTHER PUBLICATIONS

International Search Report mailed Jan. 18, 2018 in corresponding PCT International Application No. PCT/EP2017/076004.
(Continued)

*Primary Examiner* — Kevin P Kerns
*Assistant Examiner* — Jacky Yuen
(74) *Attorney, Agent, or Firm* — OSTROLENK FABER LLP

(57) ABSTRACT

A method for operating a combined casting/rolling installation: A casting machine (4) of the combined installation (2) produces a cast product (40) and a rolling mill (6, 8) of the installation (2) produces a rolled product (42a, 42b) from the cast product (40). The installation (2) has a control device (12) with a measuring unit (14) and a controller (16). The measuring unit (14) detects a rolled-product property, generates a measurement signal dependent on that property and transmits the measurement signal to the controller (16), and the controller (16) uses the measurement signal to generate a control signal for the casting machine (4) based on a control algorithm and transmits the control signal to the
(Continued)

casting machine (4) which uses the control signal to set a casting parameter. The detected rolled-product property is a temperature profile of the rolled product (42a, 42b) in the width direction thereof and the casting parameter that is set by the casting machine (4) using the control signal is a cooling parameter of the casting machine (4).

8 Claims, 2 Drawing Sheets

(51) Int. Cl.
| | |
|---|---|
| *B21B 38/00* | (2006.01) |
| *B21B 45/02* | (2006.01) |
| *B22D 11/14* | (2006.01) |
| *B22D 11/16* | (2006.01) |
| *B22D 11/22* | (2006.01) |
| *B23P 17/00* | (2006.01) |

(52) U.S. Cl.
CPC ............ *B22D 11/141* (2013.01); *B22D 11/16* (2013.01); *B22D 11/225* (2013.01); *B23P 17/00* (2013.01); *B21B 2015/0057* (2013.01)

(56) References Cited

U.S. PATENT DOCUMENTS

| | | | | |
|---|---|---|---|---|
| 4,699,202 | A | 10/1987 | Gilles | |
| 2005/0155740 | A1 | 7/2005 | Arvedi | |
| 2009/0049882 | A1 | 2/2009 | Flick et al. | 72/240 |
| 2009/0084517 | A1 | 4/2009 | Thomas | |
| 2009/0095438 | A1 * | 4/2009 | Plociennik | B22D 11/141 |
| | | | | 164/462 |
| 2010/0132426 | A1 * | 6/2010 | Baumgartel | B21B 37/74 |
| | | | | 72/342.2 |
| 2012/0006502 | A1 | 1/2012 | Bausch | 164/129 |
| 2012/0067095 | A1 * | 3/2012 | Hohenbichler | B21B 37/74 |
| | | | | 72/11.3 |

FOREIGN PATENT DOCUMENTS

| | | |
|---|---|---|
| DE | 10 2007 058 709 A1 | 2/2009 |
| EP | 0726101 A1 | 8/1996 |
| EP | 2 524 971 A1 | 11/2012 |
| EP | 3 000 539 A1 | 3/2016 |
| JP | H01-95801 A | 4/1989 |
| JP | 2013052416 A | 3/2013 |
| JP | 2013086107 A | 5/2013 |
| KR | 10-2014-0081576 A | 7/2014 |
| KR | 10-2015-0073414 A | 7/2015 |
| RU | 2089334 C1 | 9/1997 |
| RU | 2301121 C2 | 6/2007 |
| RU | 2461442 C1 | 9/2012 |
| WO | WO 01/47647 A2 | 7/2001 |
| WO | WO 2004/080628 A1 | 9/2004 |
| WO | WO 2006/042606 A1 | 4/2006 |
| WO | WO-2007121804 A1 * | 11/2007 ......... B22D 11/1246 |
| WO | WO 2010/057967 A1 | 5/2010 |

OTHER PUBLICATIONS

Written Opinion mailed Jan. 18, 2018 in corresponding PCT International Application No. PCT/EP2017/076004.
Extended European Search Report mailed May 10, 2017 in corresponding European Patent Application No. 16197488.6.
G. Arvedi, "Achievements of ISP steelmaking technology," Ironmaking and Steelmaking; vol. 37, No. 4, pp. 251-256, 2010.
K. Schwaha et al., "Arvedi ESP-Technologie—das erste Duennbrammen-Endlos-Giesswalzverfahren der Welt," BHM Berg-Und Huettenmaennische Monatshefte; Universitaet Leoben/Austria; vol. 155, No. 7, pp. 330-333, 2010 (see ISR for relevance).
Chinese Office Action, dated Jan. 19, 2020, issued in corresponding Chinese Patent Application No. 201780068847.5. Including English translation. Total 16 pages.
Russian Federation Office Action, dated Dec. 23, 2020, issue in corresponding Russian Patent Application No. 2019113108/05(025363). English translation. Total 15 pages.
European Notification from Third Party, dated Aug. 31, 2021, issued in corresponding European Patent Application No. 17780769.0. Total 8 pages.
Brochure: "Spray Nozzles for Secondary Cooling in Continuous Casting Machines" of Lechler GmbH.
Slide: "Changing nozzle water vs. repositioning nozzle" Primetals Technologies 2021-2023 Bernhard Winkler-Ebner / CE CCM TI.

* cited by examiner

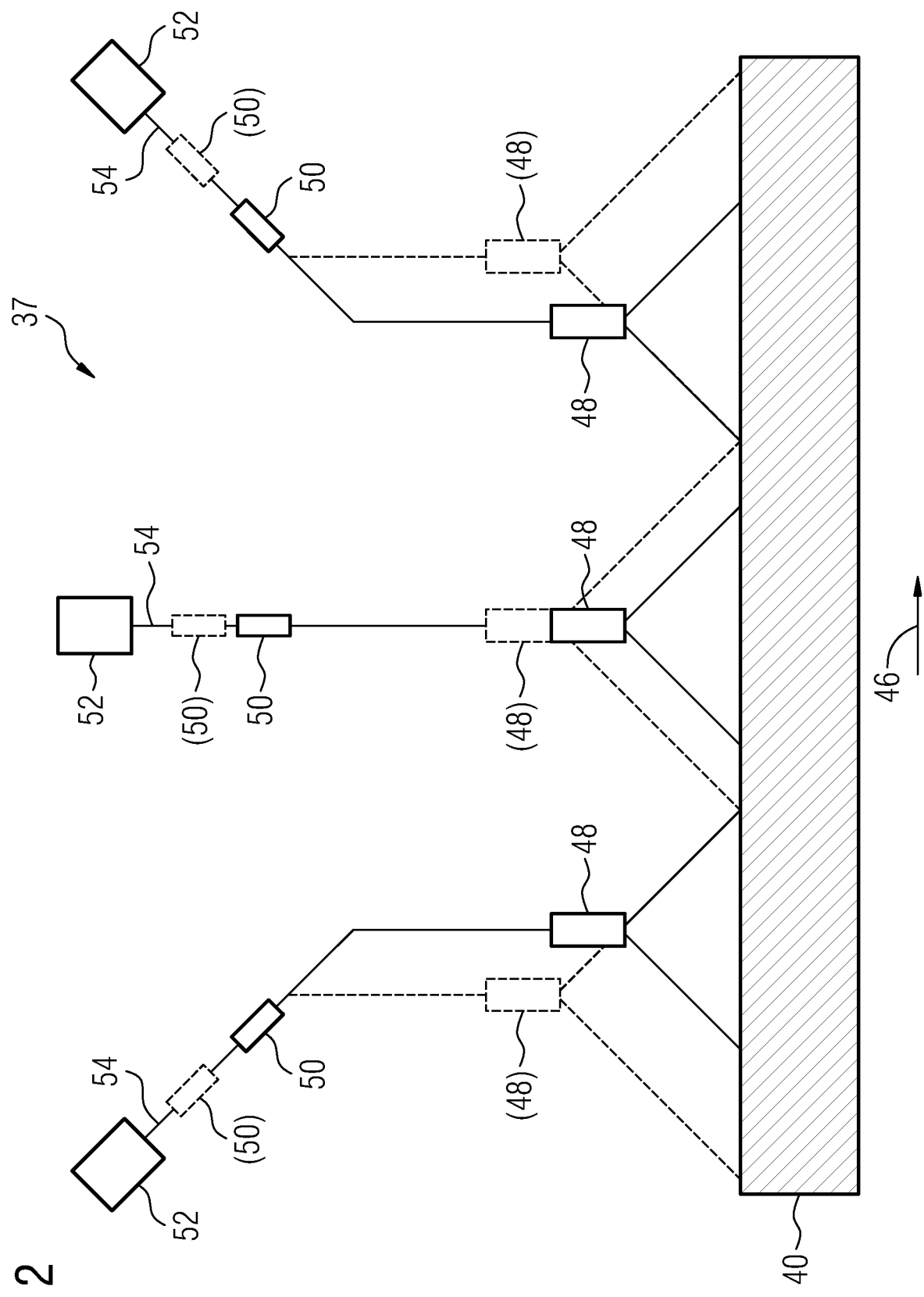

METHOD AND A CONTROL DEVICE FOR OPERATING A COMBINED CASTING/ROLLING INSTALLATION

CROSS-REFERENCE TO RELATED APPLICATIONS

The present application is a 35 U.S.C. §§ 371 national phase conversion of PCT/EP2017/076004, filed Oct. 12, 2017, the contents of which are incorporated herein by reference which claims priority of European Patent Application No. 16197488.6, filed Nov. 7, 2016, the contents of which are incorporated by reference herein. The PCT International Application was published in the German language.

The invention relates to a method for operating a combined casting/rolling installation. The invention also relates to a combined casting/rolling installation and to a control device for a combined casting/rolling installation.

BACKGROUND OF THE INVENTION

A combined casting/rolling installation comprises a casting machine and at least one rolling mill. The casting machine is used to produce a cast product and the rolling mill is used to produce a rolled product from the cast product.

Operators of combined casting/rolling installations often seek to produce rolled products with a high rolled-product quality. A high rolled-product quality may mean for example that the rolled product has a high level of homogeneity with regard to its material/surface properties and/or has a geometrical profile that corresponds to a geometrical target profile of the rolled product or deviates only slightly from the geometrical target profile.

KR 2014 0081576 A discloses a combined casting/rolling installation which comprises a casting machine for producing a cast product, a blooming mill and a finishing mill for producing a rolled product from the cast product and a control unit. A measuring unit of the combined casting/rolling installation is used to measure the speed and the cross-sectional area of the rolled product. Depending on the mass flow of the rolled product determined from the speed and the cross-sectional area of the rolled product, the control unit is used for controlling the casting speed of the casting machine.

Furthermore, WO 2004/080628 A1 discloses a combined casting/rolling installation with a casting machine for producing a cast product, a rolling mill for producing a rolled product from the cast product and a control system. In this combined casting/rolling installation, an actual temperature value of the cast or rolled product is measured at various points in the running direction of the cast or rolled product. In particular, an actual temperature value of the rolled product is measured downstream of the rolling mill. Depending on the measured temperature values, the casting speed of the casting machine is controlled by the control system.

Furthermore, DE 195 08 476 A1 discloses a combined casting/rolling installation which comprises a casting machine provided with two casting rollers for producing a cast product, a rolling installation for producing a rolled product from the cast product and a control system. In this combined casting/rolling installation, a rolled-product property, such as for example the thickness of the rolled product, the thickness profile of the rolled product or the formation of its surface, is measured and, depending on the measured rolled-product property, a casting parameter of the casting machine, such as the height of the casting level, the casting/rolling nip or the casting/rolling profile, is controlled by the control system.

SUMMARY OF THE INVENTION

An object of the invention is to provide a method for operating a combined casting/rolling installation which makes it possible to produce a rolled product with a high rolled-product quality.

Another object of the invention is to provide a control device for a combined casting/rolling installation in order to make it possible for the combined casting/rolling installation to carry out the method.

Yet another object of the invention is to provide a combined casting/rolling installation which makes it possible to produce a rolled product with a high rolled-product quality.

In the method according to the invention, a casting machine of the combined casting/rolling installation is used to produce a cast product and a rolling mill of the combined casting/rolling installation is used to produce a rolled product from the cast product. In the method, the combined casting/rolling installation has a control device with a measuring unit and a controller. In the method, a rolled-product property is detected by the measuring unit, then a measurement signal dependent on the rolled-product property is generated and the measurement signal is transmitted to the controller. The controller uses the measurement signal to generate a control signal for the casting machine based on a control algorithm and transmits the control signal to the casting machine. The casting machine uses the control signal to set a casting parameter. The rolled-product property that is detected by the measuring unit is a temperature profile of the rolled product (in the width direction thereof) and the casting parameter that is set by the casting machine using the control signal is a cooling parameter of the casting machine.

The control device according to the invention has a measuring unit and a controller that can be connected to a casting machine. The measuring unit is configured to detect a rolled-product property, to generate a measurement signal dependent on the rolled-product property and to transmit the measurement signal to the controller. In the control device according to the invention, the measuring unit is configured to detect as a property of the rolled-product a temperature profile of the rolled product in its width direction. Furthermore, the controller is configured to use the measurement signal to generate a control signal for a cooling device of the casting machine based on a control algorithm.

The combined casting/rolling installation according to the invention has a casting machine for producing a cast product and a rolling mill for producing a rolled product from the cast product. Moreover, this combined casting/rolling installation has the control device according to the invention, which has its controller connected to the casting machine of the combined casting/rolling installation and wherein the casting machine is configured to set a cooling parameter of the casting machine using the control signal provided by the controller.

The invention is based on the realization that various rolled-product properties of a rolled product produced by means of a combined casting/rolling installation are a function of casting parameters of the combined casting/rolling installation. By changing a casting parameter, one or more rolled-product properties, and consequently the rolled-product quality, can be influenced.

The invention is also based on the realization that the temperature profile of the rolled product in its width direction can have a decisive influence on the material/surface properties of the rolled product, in particular on the homogeneity of the material/surface properties, and thus on the rolled-product quality. By setting the cooling parameter of the casting machine, a temperature profile of the cast product and, since the rolled product is produced from the cast product, ultimately the temperature profile of the rolled product can be influenced. By detecting the temperature profile of the rolled product in its width direction and feeding this detected rolled-product property back to the casting machine (by way of the control signal), the temperature profile of the rolled product can be brought close to a temperature profile in which the rolled product has the material/surface properties desired by an operator of the installation.

The invention enables an installation operator to produce a rolled product with a high rolled-product quality without great know-how of the process and without great expenditure on equipment and to keep the rolled-product quality permanently at a high level.

In the invention, the value to which the casting parameter is set is not based on a value according to the experience of the installation operator but on the control signal or the information content thereof. Since the control signal is generated by using the measurement signal and the measurement signal is dependent on the rolled-product property detected by the measuring unit, ultimately the control signal also depends on the detected rolled-product property. As an illustration, the invention provides a control loop, in which feedback of the detected rolled-product property to the casting machine takes place and the casting parameter is set in an automated manner. The installation operator does not have to know the nature of the dependence between the casting parameter and the detected rolled-product property.

In the present case, an operating parameter of the casting machine is the casting parameter. Setting of the casting parameter expediently comprises changing the casting parameter. Furthermore, an operating parameter of a cooling device of the casting machine is the cooling parameter.

The control device may be used for example for a new installation. Alternatively, an existing combined casting/rolling installation may be retrofitted with the control device.

It is advantageous if the casting machine is provided with at least one signal transmission interface, by which the casting machine can be connected to the controller. In particular, the individual functional units of the casting machine may each have a dedicated signal transmission interface for a connection to the controller. Furthermore, the casting machine may be connected to the controller by a cable connection or a radio link.

Preferably, the control algorithm comprises a machine-readable program code. The control algorithm may be at least partially based on empirically determined dependencies between one or more rolled-product properties and one or more casting parameters. In particular, the control algorithm may be based on an empirically determined dependence of the temperature profile of the rolled product in its width direction and the cooling parameter of the casting machine.

Advantageously, the controller comprises a data memory and a processor. The control algorithm is expediently stored in the data memory and can be executed by the processor. Preferably, the controller is provided with a signal transmission interface, by which the controller can be connected to the casting machine.

The rolling mill may comprise one or more rolling stands. A respective rolling stand may for example be a two-high stand (two-roller stand) or a four-high stand (four-roller stand).

Expediently, the casting machine comprises a mold. The mold may be in particular a so-called curved mold or a so-called vertical mold. In a preferred design, the mold comprises two narrow-side plates. Their distance from one another is adjustable. It also comprises two broad-side plates. Advantageously, the mold is provided with a primary cooling device for cooling its plates. The primary cooling may for example use a coolant, in particular water, circulating through the plates of the mold for cooling the plates.

In addition, the casting machine expediently comprises a guiding system for guiding the cast product. Furthermore, the casting machine is advantageously provided with a secondary cooling device for cooling the cast product. For example, the secondary cooling device may have a number of cooling nozzles for spraying a coolant onto the cast product. The secondary cooling device may in particular be a component part of the aforementioned guiding system.

The measuring unit of the control device may comprise one or more measuring instruments. In particular, the measuring unit may comprise a number of different measuring instruments for detecting different rolled-product properties. The respective measuring instrument of the measuring unit may for example be a measuring instrument that measures contactlessly, which can detect a rolled-product property in particular by detection of radiation.

In an advantageous configuration of the invention, the measuring unit has a number of sensors arranged one behind the other in the width direction of the rolled product. Alternatively or in addition, the measuring unit may have an area sensor and/or a line sensor aligned in the width direction of the rolled product. The area or line sensor may for example be a CCD sensor.

Expediently, the measuring unit is provided with a signal transmission interface, by which the measuring unit can be connected to the controller. It is also expedient if the measuring unit is connected to the controller, in particular by means of a cable connection or a radio link.

The cooling parameter of the casting machine may for example be a cooling parameter of the primary cooling device, in particular a cooling power of the primary cooling device. In this case, the control signal that is generated by the controller is expediently a control signal for the primary cooling device.

In an advantageous embodiment of the invention, the cooling parameter is a cooling parameter of the secondary cooling device of the casting machine, for example a cooling power of the secondary cooling device or a cooling power profile of the secondary cooling device. In this case, the control signal that is generated by the controller is expediently a control signal for the secondary cooling device.

The cooling parameter of the casting machine may be in particular a cooling power profile in the width direction of the cast product. For example, the cooling power may be set in such a way that, with respect to the width thereof, the rolled product is cooled to a greater or lesser extent at its peripheries than in its middle.

The setting of the cooling parameter may for example comprise a setting of the position(s) of one or more cooling nozzles of the secondary cooling device of the casting machine. This makes it possible for example to eliminate a hot zone that is present in a certain region of the width of the rolled product, using one or more cooling nozzles of the secondary cooling device which is positioned such that the hot zone is cooled to a greater extent.

For setting a desired cooling power of the primary/secondary cooling device, a coolant pressure and/or a coolant volume flow for example may be set to a suitable value in the respective cooling device.

In a preferred way, the cast product produced by the casting machine is a metal strand, in particular a steel strand. The casting machine is therefore preferably a continuous casting machine.

It is also preferred if the rolled product produced by the rolling mill is a metal strip, in particular a steel strip.

The combined casting/rolling installation may preferably be a continuously operating combined casting/rolling installation, in which a cast product produced continuously by the casting machine is rolled uncut in at least one rolling mill (for example a blooming mill and a finishing mill) into a rolled product in a continuous form (also known as a continuous product). The continuous product is in particular a continuous metal strip, preferably of steel.

Alternatively, the combined casting/rolling installation may be a combined casting/rolling installation operating discontinuously (for example in so-called batch, coil-to-coil or semi-continuous operation).

In a preferred embodiment of the invention, the rolled product is produced by a hot rolling process. In other words, in the rolling mill the cast product or an intermediate product produced from the cast product is subjected to a hot rolling process. In this way, the material to be processed can undergo a forming operation with less force. A rolling process in which the material to be processed is at a temperature above its recrystallization temperature is to be understood as the hot rolling process. For heating the cast product or an intermediate product produced from the cast product, the combined casting/rolling installation may for example have a heating device, in particular an inductive heating device.

Expediently, the measuring unit detects the rolled-product property downstream of the rolling mill with respect to a running direction of the rolled product in the combined casting/rolling installation.

The rolled product can be produced by means of the rolling mill directly from the cast product. After its production, the cast product can be fed to the rolling mill for carrying out a rolling process, without first being subjected to a forming process. In this case, the rolling mill may be in particular a finishing mill.

Alternatively, an intermediate product, in particular a bloomed product, may first be produced from the cast product by a forming process, for example by a rolling process. The intermediate product may then be fed to the rolling mill for carrying out the rolling process.

In an advantageous configuration of the invention, the rolling mill is a blooming mill, also known as a pre-finishing or roughing mill. Expediently, the rolling mill in this case produces a bloomed product from the cast product. In addition, the combined casting/rolling installation may have a further rolling mill, in particular a finishing mill. The further rolling mill may in particular produce a finished product from the bloomed product. Furthermore, the measuring unit may detect the rolled-product property between these two rolling mills.

Preferably, the first-mentioned rolling mill and/or the further rolling mill are in each case a hot rolling mill.

In the case of an advantageous development of the invention, it is provided that the controller is fed a setpoint value of the rolled-product property. The control signal generated by the controller is preferably dependent on a deviation between the setpoint value of the rolled-product property and its actual value. Expediently, the actual value of the rolled-product property is determined by the controller using the measurement signal.

Advantageously, the control algorithm describes a strategy as to how the casting parameter is to be set depending on the deviation between the setpoint value and the actual value of the rolled-product property, with the aim of bringing the actual value of the rolled-product property close to its setpoint value. In other words, the casting parameter is advantageously set by the control device such that the rolled-product property corresponds to its setpoint value.

It is also preferred if the combined casting/rolling installation has an operator control unit, for example a computer. Expediently, the operator control unit is connected to the controller, in particular by a cable connection or a radio link. Advantageously, a setpoint value of the rolled-product property can be pre-set for the controller by the operator control unit.

In an advantageous development of the invention, it is provided that the secondary cooling device of the casting machine has one or more position-adjustably mounted cooling nozzles for spraying a coolant onto the cast product. It is also advantageous if the secondary cooling device has at least one adjusting device for the positional adjustment of this/these cooling nozzle(s).

The secondary cooling device is advantageously provided with one or more cooling nozzle holders. At least one of the cooling nozzles of the secondary cooling device is expediently fastened to the respective cooling nozzle holder.

Preferably, the adjusting device comprises an actuator, in particular an axially displaceable actuator. The actuator is expediently connected to one of the cooling nozzle holders. Furthermore, the adjusting device may have a hydraulically or pneumatically operable pressure-medium cylinder for displacing the actuator.

In particular, the secondary cooling device may be designed in such a way that, when there is an axial adjusting movement of the actuator of the adjusting device, an adjusting movement of the cooling nozzle holder connected to the actuator takes place in parallel with this adjusting movement. By an adjusting movement of the cooling nozzle holder, the cooling nozzle(s) fastened to the cooling nozzle holder preferably change(s) its/their distance from the cast product.

If the secondary cooling device has a number of position-adjustably mounted cooling nozzles, the secondary cooling device preferably comprises a number of such adjusting devices. In particular, the secondary cooling device may have a dedicated adjusting device for each cooling nozzle. In this way, individually adjustable cooling nozzles can be achieved. Alternatively, the secondary cooling device may have a common adjusting device for a number of the cooling nozzles, so that a number of the cooling nozzles may be adjustable by the same adjusting device.

Instead of the temperature profile of the rolled product in its width direction, the rolled-product property that is detected by the measuring unit may for example be a geometrical property of the rolled product or a material property of the rolled product. In such a case, the measuring unit is expediently designed to detect the geometrical property of the rolled product or the material property of the rolled product as the rolled-product property.

The geometrical property may for example be the width of the rolled product, a geometrical profile of the rolled product, in particular a thickness profile over the width of the rolled product, or a planarity of the rolled product, in particular in its longitudinal direction. The material property may be in particular a surface property of the rolled product. For example, the material property may be a distribution of scale defects (scale defect profile), in particular in the width direction of the rolled product, or a structure distribution, in particular in the width direction of the rolled product.

In principle, a number of different rolled product properties, particularly a number of the aforementioned rolled-product properties, can be detected by the measuring unit. The measuring unit may for example generate for each of the detected rolled-product properties a measurement signal which depends on the respective rolled-product property and transmit the respective measurement signal to the controller.

Instead of the cooling parameter, the casting parameter that is set by the casting machine using the control signal may be for example a casting width or a casting speed of the casting machine. A distance between the narrow-side plates of the mold at their outlet is to be understood as the casting width of the casting machine.

By an adjustment of the casting width, the width of the rolled product can be changed. In particular, the casting width may be set such that the width of the rolled product corresponds to its setpoint width to such an extent that it is possible to dispense with a trimming cut of the rolled product, or only minor output losses occur. Adjustment of the casting speed of the casting machine may in turn change for example a geometrical profile, a temperature profile and/or a material/surface property of the rolled product.

It may also be provided that a number of different casting parameters, in particular a number of the aforementioned casting parameters, are set by the casting machine. For each casting parameter to be set, the controller may generate a dedicated control signal for the casting machine and transmit it to the casting machine.

The description given so far of advantageous configurations of the invention includes numerous features that are in some cases reproduced as being together. However, these features may expediently also be considered individually and combined into appropriate further combinations. In particular, these features can be respectively combined individually and in any suitable combination with the method according to the invention, the control device according to the invention and the combined casting/rolling installation according to the invention. Furthermore, method features may also be regarded as properties of the corresponding device unit.

Even though some terms are used in each case in the singular or in combination with a numeral in the description, the scope of the invention is not intended to be limited to the singular or the respective numeral for these terms.

The properties, features and advantages of the invention described above and the manner in which they are achieved will be more clearly and distinctly comprehensible in conjunction with the following description of the exemplary embodiment of the invention, which is explained in greater detail in conjunction with the drawings. The exemplary embodiment is used to explain the invention and does not restrict the invention to the combinations of features, including functional features, that are specified therein. For this purpose, it is furthermore also possible for suitable features of the exemplary embodiment to be considered explicitly in isolation and combined with any one of the claims.

BRIEF DESCRIPTION OF THE DRAWINGS

In the drawings:
FIG. 2 shows a sectional representation of the combined casting/rolling installation from FIG. 1.

DESCRIPTION OF AN EMBODIMENT

Figure 1:
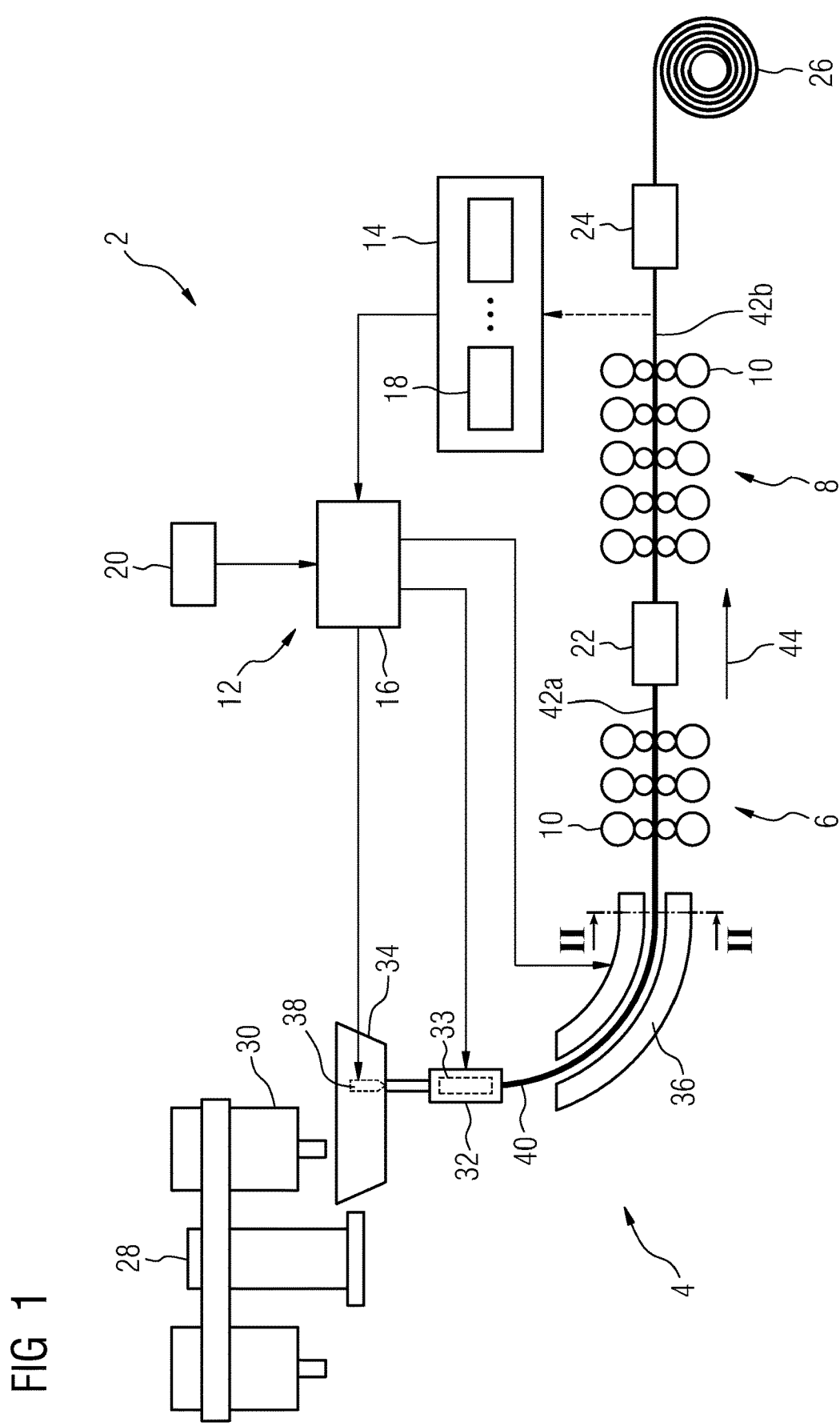
FIG. 1 shows a combined casting/rolling installation in a schematic representation.

FIG. 1 schematically shows a combined casting/rolling installation 2 for producing thin continuous metal strip. The combined casting/rolling installation 2 comprises a casting machine 4, a first rolling mill 6 and a second rolling mill 8.

The first rolling mill 6 is a blooming mill with three rolling stands 10 and the second rolling mill 8 is a finishing mill with five rolling stands 10, while the respective rolling mill 6, 8 can in principle have a different number of rolling stands 10.

The combined casting/rolling installation 2 comprises a control device 12 with a measuring unit 14 and a controller 16 connected to the measuring unit 14. The measuring unit 14 comprises a number of measuring instruments 18 for detecting various rolled-product properties. The respective measuring instrument 18 may be in particular a measuring instrument that measures contactlessly.

The combined casting/rolling installation 2 also has an operator control unit 20, connected to the controller 16, and an inductive heating device 22, arranged between the two rolling mills 6, 8. Furthermore, the combined casting/rolling installation 2 is provided with a cooling device 24, for example a laminar cooling line, and a coiling device 26.

The casting machine 4 of the combined casting/rolling installation 2 is a continuous casting machine and comprises a ladle turntable 28, in which two casting ladles 30 can be fitted, and a mold 32. The mold 32 of the casting machine 4 has two narrow-side plates, the distance of which from one another is adjustable, two broad-side plates and a primary cooling device 33 for cooling the plates, the plates of the mold 32 not being shown in the figures for the sake of better overall clarity.

In addition, the casting machine 4 comprises a tundish 34 for receiving a molten metal from the casting ladles 30 and for passing on the molten metal to the mold 32. Furthermore, the casting machine 4 has a guiding system 36 with a secondary cooling device 37 (cf. FIG. 2) and a number of guiding rollers, the guiding rollers and the secondary cooling device 37 not being shown in FIG. 1 for the sake of better overall clarity. The casting machine 4 also has a stopper 38, by means of which an inflow of the molten metal to the mold 32 is controllable.

In addition to the aforementioned elements of the installation, the combined casting/rolling installation 2 may have one or more installation elements that are not shown in the figures, such as for example a separating device, arranged upstream of the coiling device 26, for severing a metal strip.

The controller 16 is connected to the casting machine 4, in particular to the mold 32, the guiding system 36 and the stopper 38 of the casting machine 4. Furthermore, the controller 16 may control a cooling power output or a cooling power distribution of the secondary cooling device 37, a cooling power output or a cooling power distribution of the primary cooling device 33, the setting of the stopper 38 and the distance that the narrow-side plates of the mold 32 are from one another.

The casting machine 4 is used to produce a cast product 40 from the molten metal. In the present example, the cast product 40 is a metal strand. Since the process of producing the cast product 40 is known in principle to a person skilled in the art, the production process for the cast product 40 is not specified in any more detail.

The two rolling mills 6, 8 are used to produce a rolled product from the cast product 40, in the present exemplary embodiment a metal strip.

The cast product 40 emerging from the casting machine 4 is first fed to the first rolling mill 6, that is the blooming mill. The first rolling mill 6 produces a bloomed product 42a from the cast product 40, wherein the cast product 40 is subjected to a hot rolling process in the first rolling mill 6.

The bloomed product 42a emerging from the first rolling mill 6 is fed to the second rolling mill 8, that is the finishing mill. If appropriate, the bloomed product 42a is first heated by means of the heating device 22, in order to maintain a temperature of the bloomed product 42a above its recrystallization temperature. The second rolling mill 8 produces a finished product 42b from the bloomed product 42a, wherein the bloomed product 42a is subjected to a hot rolling process in the second rolling mill 8.

The measuring unit 14 detects a temperature profile of the finished product 42b in the width direction of the finished product 42b. The measuring unit 14 detects a plurality of temperature values of the finished product 42b in the width direction thereof. The measuring unit 14 generates a measurement signal dependent on this rolled-product property and transmits the measurement signal to the controller 16.

The controller 16 uses the measurement signal to generate a control signal for the secondary cooling device 37 of the guiding system 36 on the basis of a control algorithm and transmits it to the secondary cooling device 37. This control signal serves for setting a cooling power profile in the width direction of the finished product 42b.

In addition to the temperature profile of the finished product 42b in the width direction thereof, the measuring unit 14 may detect one or more further rolled-product properties of the finished product 42b, including the width of the finished product 42b, the planarity thereof, the thickness profile thereof over the width or a surface property of the finished product 42b, such as a distribution of scale defects in the width direction of the finished product 42b. Alternatively or in addition, the measuring unit 14 may detect one or more rolled-product properties of the bloomed product 42a. The respective rolled-product property may be detected downstream of the second rolling mill 8, with respect to a running direction 44 of the rolled product in the combined casting/rolling installation 2, and/or between the two rolling mills 6, 8.

For each further rolled-product property that is detected by the measuring unit 14, the measuring unit 14 generates a further measurement signal dependent on the respective further rolled-product property and transmits it to the controller 16.

The controller 16 uses the further measurement signal or the further measurement signals to generate one or more control signals for setting one or more casting parameters on the basis of the aforementioned control algorithm. The respective control signal is transmitted from the controller 16 to the casting machine 4.

The respective control signal generated by the controller 16 is dependent on a deviation between a setpoint value of a rolled-product property and its actual value, wherein the setpoint value of the respective rolled-product property is pre-set for the controller 16 by the operator control unit 20 and the actual value of the respective rolled-product property is determined by the controller 16 using the associated measurement signal.

In addition to the cooling power profile of the secondary cooling device 37 in the width direction of the finished product 42b, the casting machine 4 may use the control signal or the control signals to set one or more other casting parameters, such as a casting width, a casting speed and/or the cooling power output or cooling power distribution of the primary cooling device 33. The casting parameter or parameters is/are set by the casting machine 4 in such a way that the actual value of the respective rolled-product property is brought close to its setpoint value.

The finished product 42b emerging from the second rolling mill 8 is cooled by means of the cooling device 24 and coiled by the coiling device 26.

FIG. 2 shows a section through the combined casting/rolling installation 2, to be more precise through its guiding system 36, along the sectional plane II-II from FIG. 1.

In FIG. 2, the cast product 40 is depicted in cross section. The width direction 46 thereof, which at the same time corresponds to the width direction of the bloomed product 42a and the finished product 42b, is represented in the form of an arrow.

Also depicted in FIG. 2 is part of the secondary cooling device 37 of the guiding system 36 (from FIG. 1). On the other hand, guiding rollers of the guiding system 36 are not shown for the sake of better overall clarity.

The secondary cooling device 37 comprises a number of cooling nozzles 48 for spraying a coolant onto the cast product 40, of which three cooling nozzles 48 arranged in a plane are depicted by way of example in FIG. 2, arranged offset in relation to one another in the width direction 46 of the cast product 40.

In the present exemplary embodiment, the secondary cooling device 37 has for each of the cooling nozzles 48 a dedicated cooling nozzle holder 50 and a dedicated adjusting device 52 with an axially displaceable actuator 54 (for example a plunger). The respective cooling nozzle 48 is fastened to the associated cooling nozzle holder 50, which in turn is connected to the actuator 54 of the associated adjusting device 52. Moreover, the adjusting devices 52 are in each case fastened to a stand frame of the guiding system 36 that is not shown in the figures.

The secondary cooling device 37 is configured such that, when there is an axial adjusting movement of the actuator 54 of an adjusting device 52, an adjusting movement of the associated cooling nozzle holder 50 and of the cooling nozzle 48 fastened to the cooling nozzle holder 50 takes place in parallel with this adjusting movement. The adjusting movement of a cooling nozzle 48 has the effect that this cooling nozzle 48 changes its distance from the cast product 40 and from the other cooling nozzles 48 arranged in the same plane.

To illustrate such an adjusting movement, the cooling nozzles 48 and the associated cooling nozzle holder 50 are respectively depicted in FIG. 2 in a first position (represented by a solid line), closer to the cast product 40, and in a second position (represented by a dashed line), further away from the cast product 40.

The cooling nozzles 48 depicted in FIG. 2 are arranged for example above the cast product 40. The secondary cooling device 37 may also have such cooling nozzles and cooling nozzle holders assigned to these cooling nozzles and adjusting devices underneath the cast product 40. Further, in front of and behind the plane of the drawing of FIG. 2, the secondary cooling device 37 comprises further such cooling nozzles, arranged next to one another in the width direction 46 of the cast product 40, and cooling nozzle holders assigned to these cooling nozzles, and adjusting devices.

The aforementioned setting of the cooling power profile of the secondary cooling device 37 in the width direction of the finished product 42b may comprise setting the position(s) of one or more cooling nozzles 48 in relation to the cast product 40. In order to change the cooling power profile of the secondary cooling device 37 in the width direction of the finished product 42b, therefore, the position(s) of one or more cooling nozzles 48 may be changed. Alternatively or in addition, for one or more cooling nozzles 48, the volume flow of the coolant emerging from the respective cooling nozzles 48 may be changed.

Although the invention has been illustrated more specifically and described in detail by the preferred exemplary embodiment, the invention is not restricted by the example disclosed and other variations may be derived therefrom without departing from the scope of protection of the invention.

LIST OF DESIGNATIONS

2 Combined casting/rolling installation
4 Casting machine
6 Rolling mill
8 Rolling mill
10 Rolling stand
12 Control device
14 Measuring unit
16 Controller
18 Measuring instrument
20 Operator control unit
22 Heating device
24 Cooling device
26 Coiling device
28 Ladle turntable
30 Ladle
32 Mold
33 Primary cooling device
34 Tundish
36 Guiding system
37 Secondary cooling device
38 Stopper
40 Cast product
42a Bloomed product
42b Finished product
44 Running direction
46 Width direction
48 Cooling nozzle
50 Cooling nozzle holder
52 Adjusting device
54 Actuator

The invention claimed is:

1. A method for operating a combined casting/rolling installation, comprising:
   operating a casting machine of the combined casting/rolling installation for producing a cast product, the casting machine having a mold having a primary cooling device and a guiding system with a secondary cooling device comprising a plurality of nozzles arranged along a width direction of the cast product, each nozzle of the plurality of nozzles being displaceable relative to the other nozzles of the plurality of nozzles and displaceable relative to the cast product independently of the other nozzles of the plurality of nozzles, the cast product exiting the mold and passing through the guiding system to the rolling installation; and
   then operating a rolling mill of the combined casting/rolling installation to produce a rolled product from the cast product;
   wherein the combined casting/rolling installation has a control device with a measuring unit and a controller;
   operating the measuring unit to detect a rolled-product property and to generate a measurement signal dependent on the rolled-product property and transmitting the measurement signal to the controller, wherein
   the rolled-product property that is detected by the measuring unit is a temperature profile of the rolled product in the width direction thereof; and
   obtaining a preset material/surface property for the rolled product by causing the controller to generate a control signal with an algorithm based on the measurement signals to control the casting machine and transmitting the control signal to the casting machine to set a temperature profile of the cast product to obtain a temperature profile for the rolled product in the width direction of the rolled product that results in the preset material/surface property for the rolled product, and cooling the cast product with the secondary cooling device based on the control signal by changing a distance between at least one of the nozzles of the plurality of nozzles and the cast product, and a distance between the at least one of the nozzles of the plurality of nozzles and the other nozzles of the plurality of nozzles by repositioning with an actuator the at least one of the nozzles of the plurality of nozzles relative to the cast product and the other nozzles of the plurality of nozzles independently of the other nozzles of the plurality of nozzles; and
   wherein the rolling mill is a blooming mill and the combined casting/rolling installation comprising a further rolling mill, wherein the further rolling mill is a finishing mill, and
   wherein the temperature profile of the rolled product is detected with respect to a running direction of the rolled product between the blooming mill and the finishing rolling mill, or downstream of the finishing rolling mill.

2. The method as claimed in claim 1, wherein the cast product generated by the casting machine is a metal strand.

3. The method as claimed in claim 1, wherein the rolled product generated by the rolling mill is a metal strip.

4. The method as claimed in claim 1, further comprising continuously operating the combined casting/rolling installation for causing the rolled product generated by the combined casting/rolling installation to be a continuously rolled metal strip.

5. The method as claimed in claim 1, further comprising generating the rolled product by a hot rolling process.

6. The method as claimed in claim 1, further comprising feeding a setpoint value of the rolled-product property to the controller and the control signal generated by the controller is dependent on a deviation between the setpoint value of the rolled-product property and an actual value of the rolled product property, and determining, the actual value of the rolled-product property by the controller using the measurement signal.

7. The method as claimed in claim 1, wherein, in the repositioning with the actuator, the at least one of the nozzles' distance to the cast product and the at least one of the nozzles' distance to at least another one of the nozzles of the plurality of nozzles are changed simultaneously.

8. The method as claimed in claim 1, wherein the at least one of the nozzles of the plurality of nozzles is fastened to a nozzle holder, and wherein the nozzle holder is connected to the actuator, and further comprising operating the actuator to move the nozzle holder along a direction that is at an oblique angle to the direction of travel of coolant exiting the at least one of the nozzles of the plurality of nozzle, whereby, in the repositioning with the actuator, the at least one of the nozzles' distance to the cast product and the at least one of the nozzles' distance to at least another one of the nozzles of the plurality of nozzles are changed simultaneously.

* * * * *